United States Patent [19]

Lantero

[11] Patent Number: 4,586,689
[45] Date of Patent: May 6, 1986

[54] CABLE-BASED AMORTIZATION SUPPORTS WITH INDEPENDENT REACTION TO VERTICAL AND HORIZONTAL STRESSES

[75] Inventor: Palmiro Lantero, Genoa, Italy

[73] Assignee: Officine Meccaniche Liguri de P. Lantero, Genoa, Italy

[21] Appl. No.: 607,422

[22] Filed: May 7, 1984

[30] Foreign Application Priority Data

May 5, 1983 [IT] Italy ................ 12511 A/83

[51] Int. Cl.⁴ .................................................. F16F 3/00
[52] U.S. Cl. .................................................. 248/570
[58] Field of Search ............ 248/636, 568, 570; 267/140.5, 141.1, 148, 149, 150

[56] References Cited

U.S. PATENT DOCUMENTS

| | | | |
|---|---|---|---|
| 2,941,777 | 6/1960 | Allen | 248/568 |
| 3,204,913 | 9/1965 | Lawrence | 248/568 |
| 3,351,307 | 11/1967 | Michel | 248/636 |

FOREIGN PATENT DOCUMENTS

| | | | |
|---|---|---|---|
| 1372335 | 8/1964 | France | 248/636 |
| 88454 | 1/1967 | France | 248/636 |
| 1569208 | 4/1969 | France | 248/636 |
| 719986 | 11/1966 | Italy | 248/636 |
| 12455A/78 | 2/1978 | Italy | |
| 1028946 | 2/1979 | Italy | |

*Primary Examiner*—Reinaldo P. Machado
*Assistant Examiner*—Alvin Chin-Shue
*Attorney, Agent, or Firm*—Jacobs & Jacobs

[57] ABSTRACT

This patent covers a cable-based amortization support having independent reactions to vertical and horizontal stresses supported by combined cable windings of any nature.

This shock absorber is consisting of one spiral winding (3) and of at least one arrangement of semicircular cable sections or lengths (11, 12), respectively secured sideways and at their end onto rigid supporting elements (1, 5, 9, 10) so as to insure that the resistance to vertical actions (V) will have either constant or progressive characteristics, while the resistance to horizontal actions (0) will have constant characteristics, whereas the ratio between these two characteristics may have any desired value.

6 Claims, 11 Drawing Figures

CABLE-BASED AMORTIZATION SUPPORTS WITH INDEPENDENT REACTION TO VERTICAL AND HORIZONTAL STRESSES

It is well known that amortization supports and shock absorbers are used to a great extent to protect machines, equipment and precision instruments from shocks and vibrations.

Shock absorbers and dampers are used, for instance, in reciprocating machines such as presses, printers, shearing machines etc. causing very strong impacts and vibrations at each operation. Shock absorbers and dampers are also necessary in artillery fire control stations to absorb the strong recoil and to protect the data processing equipment.

More generally, in industrial plants, on board ships and aircraft etc. control and monitoring equipment has to be protected since this kind of installations is always very delicate and sensitive.

These sometimes very difficult problems, also due to the miniaturization of some of the parts to be protected, can now be solved with the aid of elastic supports (rubber, plastic and similar products) which have, however a high deterioration rate when exposed to thermal gradients. In addition these elastic mountings have also the drawback of not being able to absorb at the same time vibrations and impacts, eliminating secondary waves or wave tails which take always a long time to be disposed of.

These supports, shock absorbers or dampers have also the disadvantage of withstanding only small loads while having usually a high ratio between the weight of the supporting structure and the static weight of the supported load.

Special shock absorbers have been recently brought on the market consisting of spiral wound wire rope of limited weight, having a low cost and unlimited life, which offer the advantage of eliminating vibration and damping shocks and impact virtually without wave tails.

For instance the Italian Pat. Nos. 719.986 and 1.028.946 show shock absorbers in which shocks and vibrations are absorbed by a cylindrical spiral wound wire rope, whereas in the Italian application for Letters Patent No. 12455/78 damping is obtained by a garter spring type wire rope spiral.

The wire rope shock absorbers, although representing a significant progress in this sector, still have the serious drawback of having a rigid reactive funtion and characteristic because of the stable relation between vertical and horizontal stress absorption.

As a rule, the horizontal absorption of these wire-rope shock absorbers is of the order of magnitude ranging between 25% and 35% of their vertical absorption capacity and they can therefore not be used for strong horizontal stresses or else they have to be overdimensioned involving unnecessary cost and weight increase.

This present invention has therefore the aim to devise an amortization support or shock absorber of the multiple cable type apt to ensure, in its various configurations, independent or variable absorption of the horizontal and vertical stresses, with the possibility, for instance, to absorb horizontal stresses twice as much as the vertical stresses thus solving all installation difficulties in civil and military applications.

The shock absorber of this invention comprises two types of cable windings:

(a) spiral wound cables
(b) semicircular wound cable sections.

The windings (a) and (b) may have a rectilinear or a toroidal pattern as explained hereinafter.

By varying the cable section and type as well as the arrangement of the windings, it will be possible to obtain shock absorbers with differentiated impact strength and vibration damping capacity within the scope of this invention and in particular shock absorbers having a progressive action depending on the stress value.

The Patent in question is illustrated by some exemplified toroidal implementations as shown in the enclosed drawings, in which.

Figure 1:
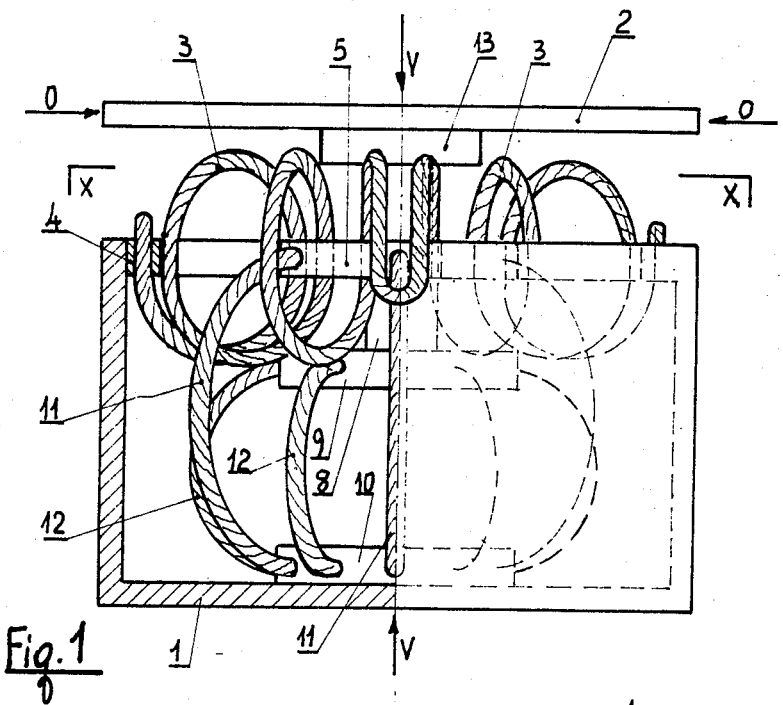
FIG. 1 shows a lateral and partial sectional view of a multiple cable shock absorber according to the present invention.
Figure 2:
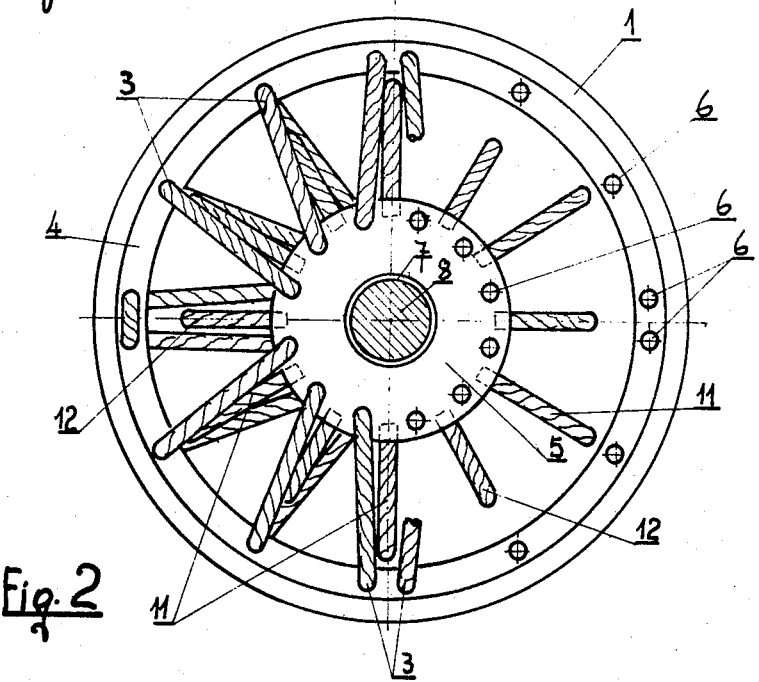
FIG. 2 shows a section according to X—X of the shock absorber illustrated in FIG. 1.
Figure 3:
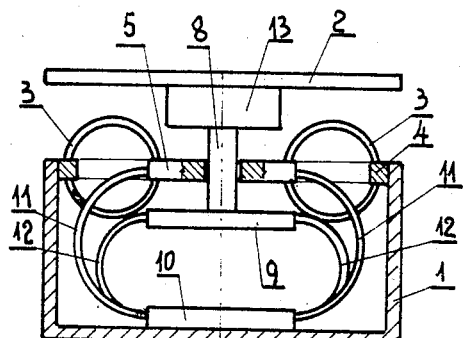
FIG. 3 shows a schematic cross section of the shock absorber shown in FIGS. 1 and 2.

With reference to these FIGS. 1, 2 and 3, the shock absorber of this invention, is consisting of a lower fixed bearing base 1 having the configuration of an open box and of a plate shaped upper base 2 on which the mechanism or device to be protected or the mechanism or device creating the shock, impact or vibration, is resting.

A toric spiral cable 3 with type (a) winding is nested between the two above bearing elements 1 and 2, the turns of the spiral being sideways fastened onto the lower base element 1 and centrally secured to a disk 5.

In the illustrated exemplification this securing is achieved by threading the cable 3 through the holes 6 thus stringing together the projection 4 to the disk 5 but other fastening systems are also possible, as will be explained later.

It should be observed that the toroidal spiral should preferably change its winding direction every 90° as shown in the drawing, or every 180°, so as to prevent torsional stresses between the supporting elements 1 and 5.

The shock absorber in question also features the afore said disk 5 with a central hole 7 in which the pin 8 is freely sliding axially, its upper end being fixed to the upper plate bearing 2, while its lower end is bearing an intermediate disk 9. A fixed bottom disk 10 is mounted inside the lower supporting element 1.

According to the present invention, two type (b) windings are also provided, i.e. a winding consisting of a certain number of cable lengths forming a semicircle 11, the ends of which are radially secured onto the edges of the upper 5 and bottom disc 10, while another winding is created by a certain number of semicircular cable sections 12, the ends of which are fastened to the periphery of the intermediate 9 and bottom disk 10. The ends of these cable lengths 11 and 12 can be secured to the disk, for instance, by threading the cable ends through radial holes and blocking them by welding, a bonding agent or by melting.

Obviously, in addition to the spiral wound and semicircular cable sections 3, 11 and 12, other winding types are also possible to be secured to other ties, disks and to the bottom disk.

The shock absorber system of the present invention operates as follows to absorb vertical forces. When a vertical force is applied to the plate 2, pin 8 will slide downwardly in hole 7 of disc 5, thereby causing disc 9 to move downwardly. The vertical force is thus first applied to and absorbed or resisted by cable lengths 12. Continued movement of plate 2 downwardly will cause shim 13 to contact disc 5, whereupon plate 2 and disc 5 will move downwardly as a unit, and the vertical force will now be absorbed and resisted by spiral winding 3 and sectional winding 11, together with any additional sectional cable lengths, if used. Due to the use of at least three windings disposed as described, shock absorption is effected in a progressively stronger manner.

The horizontal actions are supported at the same time by the three windings 3, 11 and 12 providing a constant resistance which is the sum of the three separate resistances.

Figure 4:
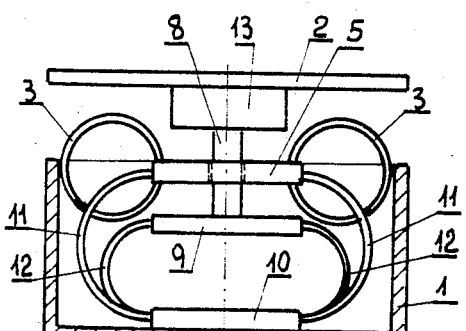
FIGS. 4 to 11 show a schematic cross section of various solutions for shock absorbers derived from the solution illustrated in the FIGS. 1, 2 and 4.

In the variation shown in FIG. 4, the toroidal spiral 3 is not secured to the bearing element 1, so that the spiral 3 is not counteracting the vertical actions, but is acting as a peripheral back-up in horizontal actions.

The shock absorber herein described can be used in many normal applications, but in specific cases involving reduced dimensions and weight of the supported items, it may be advisable to simplify the shock absorber in question within the general informative conception of the present invention.

Figure 5:
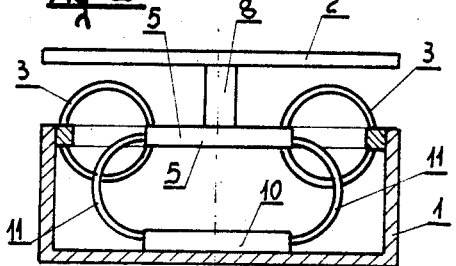

For instance in FIG. 5, the intermediate disk 9 is eliminated while the pin 8 is secured to the disk 5.

The shock absorber of FIG. 5 is thus consisting only of the toroidal spiral 3 and of the sectional winding 11 with a characteristic constant resistance to vertical and horizontal actions. In this case too, the toroidal winding 3 can be fixed or not to the base element 1.

Figure 6:
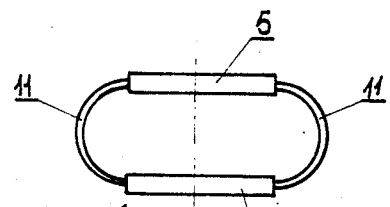

In FIG. 6, the shock absorber is only consisting of cable lengths 11 fitted between the disks 5 and 10 having the direct function of top and bottom supporting elements. This solution is similar to the known configuration illustrated in the Italian Pat. No. 12455 A/78 consisting of one single toroid shaped spiral, except for the fact that the resisting mechanism of FIG. 6 is not one integral spiral but rather a series of semi-circular cable lengths.

Figure 7:
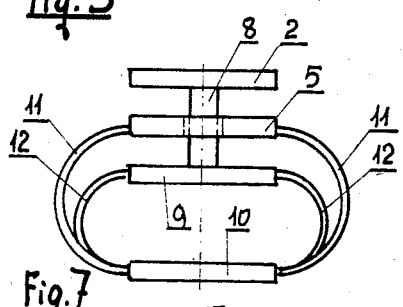

FIG. 7 shows another shock absorber derived from the FIGS. 1, 2 and 3 in which the toroid spiral winding 3 is eliminated while the semicircular sections 11 and 12 remain. The bottom disc 10 is acting as base element. In this solution, the vertical stresses are progressively applied, acting first on the winding 11 and then, when the supporting element 2 is resting on the disk 5, the stresses are extended to the winding 12 while the horizontal actions are absorbed by both windings 11 and 12 with a constant characteristic.

Figure 8:
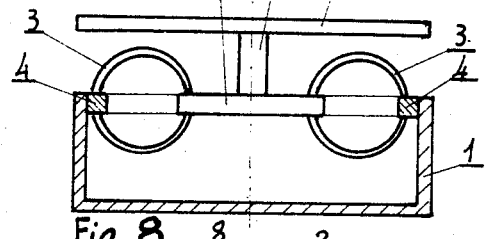

Another variation is shown in FIG. 8 in which the two sectional windings 11 and 12 are eliminated so that only the toroid shaped spiral winding remains having constant resistance characteristics to both vertical and horizontal stresses.

This solution is similar to the known toroid spiral winding of the Italian Pat. No. 12455 A/78 but for the fact that in this Italian Patent the turns are compression stressed, while in the present invention the stresses are applied between the peripheral and internal part of the turns.

Figure 9:
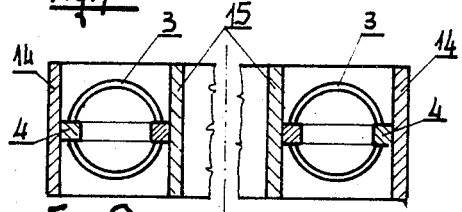

The solution illustrated in FIG. 9 is like the one shown in FIG. 8, but in this case the supporting elements are an external 14 and internal ring 15 featuring a projection 4. This shock absorber can be used to secure the item to be protected inside the internal ring 15, whereas the internal ring 14 forms a fixed base.

Figure 10:
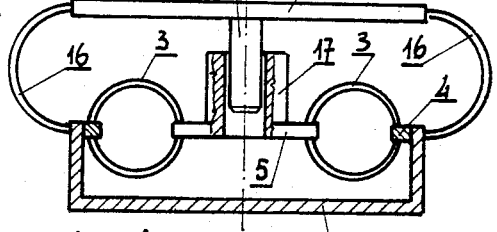
Figure 11:
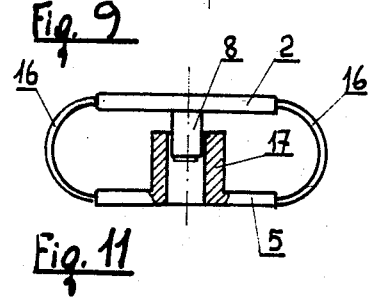

FIG. 10 features a shock absorber derived from FIG. 8, and has in addition to the toroidal winding 3, semicircular cable sections 16 peripherally connecting the two base elements 1 and 2. In this solution, the pin 8 secured to the supporting element 2 is axially moving in a bushing or sleeve 17 fastened onto the disk 5.

In this way, vertical actions are first counteracted by the winding 16 and then, after the supporting element 2 is resting on the bushing or sleeve 17, by the winding 3 thus obtaining a progressive action, while the horizontal stresses are opposed with a constant characteristic. The solution no. 11 is also derived from FIG. 10, but in this case the toroidal spiral winding 3 is missing.

Obviously, all shock absorbers described herein can be arranged as in the drawing or may be turned upside down, with their base element 1 at the top and element 2 at the bottom.

The circular shaped shock absorber herein described may be elliptic or linear shaped or in sections; if linear shaped, the spiral winding 3 will be cylindrical and the sectional lengths 11 and 12 will be arranged in rows on the two sides of the shocks absorber.

Non elastic structural components of the shock absorber support can be implemented with any kind of known technology (press forming, melting, structural steelwork etc.) and in any suitable material (metal, plastic, etc.).

The elastic components of the shock absorber are consisting, as explained above, of cable windings which can be of various nature such as metal ropes (wire ropes) with and without core for high or medium weight and stresses, or in vegetable stranded or manmade fiber wires for small and very small loads and stresses as in the case of electronic components.

Fastening of these spiral wound cables and wire lengths to structural components can be achieved by various methods such as knotting, welding, glueing, clamping, melting, vulcanization or cold cure, weaving etc. and the same holds also true for securing the base elements to the bearing structure and to the item to be supported.

It is clear that the supports subject matter of this Patent can be protected by external rigid or flexible housing or casings.

According to its objective, the present invention provides for a basic shock absorbing support consisting of various components and various derivative dampers or shock absorbers as generally outlined herein but not limited to the exemplified solutions apt to meet the various practical needs with excellent shock, impact and vibration absorption without wave tails through a progressive and cumulative action of various winding types at the planned and/or desired vertical/horizontal stress ratio.

I claim:

1. A shock absorber, which comprises a first support means disposed horizontally upon which the stress to be absorbed is applied; a second support means having bottom wall means and side wall means defining an open box configuration and located below said first support means; a horizontally disposed first disc member having an aperture therein; a horizontally disposed second disc member below said first disc member; pin means slidably disposed within said aperture and having one end connected to said first support member and the other end connected to said second disc member; a plurality of first semi-circular cable means connecting said second disc member to said bottom wall means and a plurality of second semi-circular cable means connecting said first disc member to said bottom wall means, whereby a vertical force applied to said first support means will be progressively absorbed by said plurality of first semi-circular cable means, and then, when said first support means contacts and is moved as a unit with said first disc member, by said second semi-circular cable means.

2. Apparatus as described in claim 1, wherein it has a rectilinear shape with the spiral cable means arranged as a cylinder and the semi-circular cable means arranged in lateral rows.

3. Apparatus as described in claim 1, wherein said cable means are wire ropes with or without core.

4. Apparatus according to claim 1, wherein a toroidal spiral cable means is connected between said side wall means and said first disc member, whereby said spiral cable means absorbes horizontal and vertical forces.

5. Apparatus according to claim 1, wherein a toroidal spiral cable means is connected to said first disc member and is adjacent but not connected to said side wall means, whereby said spiral cable means absorbs horizontal forces.

6. A shock absorber, which comprises a first support means disposed horizontally upon which the stress to be absorbed is applied; a second support means having side wall means defining an open box configuration and located below said first support means; a horizontally disposed disc member having an aperture therein; toroidal spiral cable means connected between said side wall means and said disc member; pin means depending from said first support means and slidably disposed within said aperture; and a plurality of semi-circular cable means connected between said first support means and said side wall means; whereby a vertical force applied to said first support means will be absorbed by said plurality of semi-circular cable means, and then, when said first support means contacts and is moved as a unit with said disc member, by said spiral cable means.

* * * * *